Dec. 21, 1943.    O. J. SCHORER    2,337,351
PERCUSSIVE TOOL
Filed Nov. 24, 1942
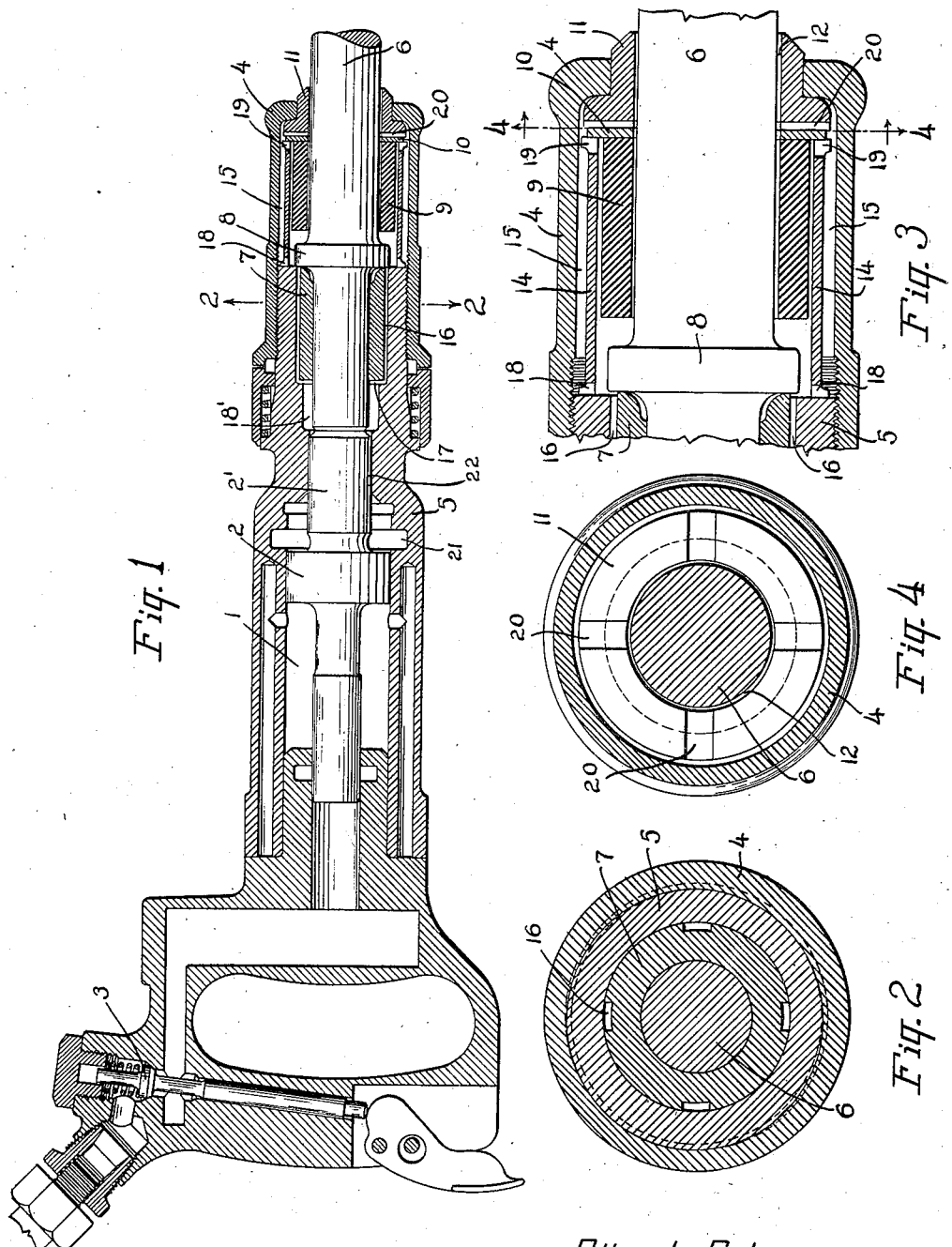
Otto J. Schorer,
INVENTOR
BY
ATTORNEY Patented Dec. 21, 1943

2,337,351

UNITED STATES PATENT OFFICE 2,337,351

PERCUSSIVE TOOL

Otto J. Schorer, Northampton, Mass., assignor to Worthington Pump and Machinery Corporation, Harrison, N. J., a corporation of Delaware Application November 24, 1942, Serial No. 466,753

3 Claims. (Cl. 121—32)

This invention relates to percussive tools and more particularly to hand held percussive tools such as clay spades or diggers or the like.

In the operation of percussive tools such as clay diggers, or the like, it is necessary for the operator at times to hold the forward end of the tool during operation, and it has been found that frequently the forward or chuck end of the tool becomes so hot after a comparatively short period of operation that it is impossible for the operator to hold it without injury to himself.

It is an object of the present invention to provide means for effectively cooling the forward or chuck end of the tool so as to prevent objectionable heat thereof.

More specifically the present invention comprehends a percussive tool of the type specified which embodies an air chamber within the chuck structure of the tool into which cooling air is circulated during operation of the tool.

With these and other objects in view, as may appear from the accompanying specification, the invention consists of various features of construction and combination of parts, which will be first described in connection with the accompanying drawing, showing a percussive tool of the preferred form embodying the invention, and the features forming the invention will be specifically pointed out in the claims.

In the drawing:

Figure 1 is a longitudinal section through a clay digger constructed in accordance with the present invention.

Figure 2 is a cross section taken on the line 2—2 of Figure 1.

Figure 3 is an enlarged longitudinal section of the chuck end of the tool.

Figure 4 is a cross-section taken on the line 4—4 of Figure 3.

Referring more particularly to the drawing, the improved percussive tool or clay digger includes the cylinder 1 in which a hammer piston 2 is reciprocated under action of pressure fluid, and the reciprocation of the hammer piston 2 is controlled in the usual approved manner by manipulation of the pressure fluid control valve 3. These features of the tool may be of any approved type now in common use.

The tool has a chuck housing 4 detachably connected to the forward end of the cylinder carrying body 5 which chuck receives the shank 6 of the tool or spade (not shown). The chuck structure includes the usual type of chuck bushing 7 which engages the collar 8 on the shank 6. The usual type of resilient shock absorbing sleeve or buffer 9 is indicated within the chuck 4 but a split washer 10 and a mud ring 11 is inserted at the forward or outer end of the chuck and surrounds the shank, having a slight clearance between the inner bore of the mud ring 11 and the shank 6 as indicated at 12.

A sleeve 14 is placed within the chuck about the shock absorbing sleeve or buffer 9 and it engages the forward end of the body 5 at one end and the split washer 10 at the other end. The sleeve 14 is spaced from the inner wall of the chuck 4 to provide an annular air chamber 15 within the chuck. The chuck bushing 7 is provided with a plurality of longitudinally extending circumferentially spaced grooves 16 which communicate with corresponding grooves 17 in the rear end of the bushing. The grooves 17 open into the air space 18' about the rear end of the shank 6. Both ends of the sleeve 14 are provided with a plurality of circumferentially spaced radially extending grooves or passages 18 and 19. The grooves 18 and 19 open into the air chamber 15. During the return or rearward movement of the hammer piston 2, live or pressure air is admitted into the forward chamber 21. During the rearward movement of the piston the extension 2' will move out of the portion 22 of the cylinder bore and thus allow air to pass from the chamber 21 into the space 18', from the space 18' through the grooves 17 and 16 in the cylinder bushing and thence through the ports 18 into and through the cooling chamber 15. The air passes out of the cooling chamber 15 through the grooves 19 and from thence through the grooves 20 in the inner end of the mud ring and out of the chuck through the clearance space between the bore of the mud ring 11 and the shank 6 of the tool.

The split washer 10 is positioned between the inner end of the mud ring 11 and the forward or outer end of the sleeve 14 and also against the forward or outer end of the resilient bushing 9 so as to prevent closing or blocking of the radial grooves 20 with the resultant disruption of the circulation of cooling air through the chuck.

It will be understood that the invention is not to be limited to the specific construction or arrangement of parts shown, but that they may be widely modified within the invention defined by the claims.

What is claimed is:

1. In a percussive tool of the hand supported type, a body having a cylinder provided with an air reciprocated piston and an air passage leading from the cylinder, a tool carrying chuck assembly comprising a chuck housing detachably connected with said body and provided with a tool receiving opening, a bushing in said air passage and a buffer in said housing, and a sleeve in said chuck housing about said buffer and interposed endwise between said body and said chuck housing, said sleeve being spaced from said chuck housing to provide an air chamber for cooling the chuck assembly said bushing being of such shape with respect to said air passage as to admit air to said sleeve, said sleeve having an air inlet leading into said air chamber and said air chamber being provided with an air outlet for releasing air from the air chamber into said tool receiving opening and to the atmosphere.

2. In a percussive tool of the hand supported type, a body having a cylinder provided with an air reciprocated piston and an air passage leading from the cylinder, a tool carrying chuck assembly comprising a chuck housing detachably connected with said body and provided with an air outlet, a bushing in said passage and a buffer in said chuck housing, and a sleeve in said chuck housing about said buffer and interposed endwise between said body and said chuck housing, said sleeve being spaced from said chuck housing to provide an air chamber for cooling the chuck assembly, said bushing being grooved to admit air to said sleeve, said sleeve being open adjacent its ends to admit air into said air chamber, said chamber being provided with an outlet for releasing air from said air chamber into said first mentioned outlet for escape to the atmosphere.

3. In a percussive tool of the hand supported type, a body having a cylinder provided with an air reciprocated piston and an air passage leading from the cylinder, a tool carrying chuck assembly having a chuck housing detachably connected with said body and provided with a tool receiving opening, a bushing in said air passage, a resilient buffer in said chuck housing, a sleeve in said chuck housing about said buffer and interposed endwise between said body and said chuck housing, a mud ring arranged between one end of said sleeve and said chuck and having a tubular liner for said tool receiving opening, a washer interposed between the said one end of said sleeve and said mud ring, said sleeve being spaced from said chuck housing to provide an air chamber for cooling the chuck assembly, said bushing being grooved to admit air from said air passage into said sleeve, said sleeve being provided with passages for admitting air into said air chamber, and said mud ring being provided with grooves adjacent said washer for placing said air chamber in communication with said tubular liner to release air from the air chamber to the atmosphere.

OTTO J. SCHORER.